United States Patent [19]

Smilek et al.

[11] 3,710,532
[45] Jan. 16, 1973

[54] APPARATUS AND METHOD FOR STACKING ARTICLES

[75] Inventors: Norman N. Smilek; Joseph T. Lockley, both of New Castle, Pa.

[73] Assignee: Lockley Manufacturing Co., Inc., New Castle, Pa.

[22] Filed: Aug. 2, 1971

[21] Appl. No.: 168,098

[52] U.S. Cl. ........................................53/26, 53/157
[51] Int. Cl. ........................B65b 35/38, B65b 35/50
[58] Field of Search..................53/26, 157, 159, 247; 214/1 BC, 1 BD, 6 FS, 6 P; 294/64 R, 65, 65.5

[56] References Cited

UNITED STATES PATENTS

| | | | |
|---|---|---|---|
| 2,524,846 | 10/1950 | Socke et al. | 53/247 X |
| 3,200,969 | 8/1965 | Madden | 214/6 P |
| 3,431,698 | 3/1969 | Bathellier | 53/157 X |
| 3,568,393 | 3/1971 | King et al. | 53/26 X |

*Primary Examiner*—Robert L. Spruill
*Attorney*—J. Herman Yount, Jr. et al.

[57] ABSTRACT

An apparatus and a method for stacking materials, such as articles and separator sheets, include a platen movable between a sheet pickup position and an article pickup position. Means is provided to move the platen between the sheet pickup position and the article pickup position. A separator sheet pickup means is mounted on the platen for picking up at least one separator sheet from a supply of separator sheets upon actuation thereof. The apparatus also includes an article pickup means on the platen for picking up at least one article from an array of articles upon actuation thereof. The platen is operable to support in a stacked array both the articles and separator sheets simultaneously. When simultaneously supporting the articles and separator sheets, the platen is moved to an unloading position where the articles and separator sheets are simultaneously released from the platen onto a pallet.

15 Claims, 6 Drawing Figures

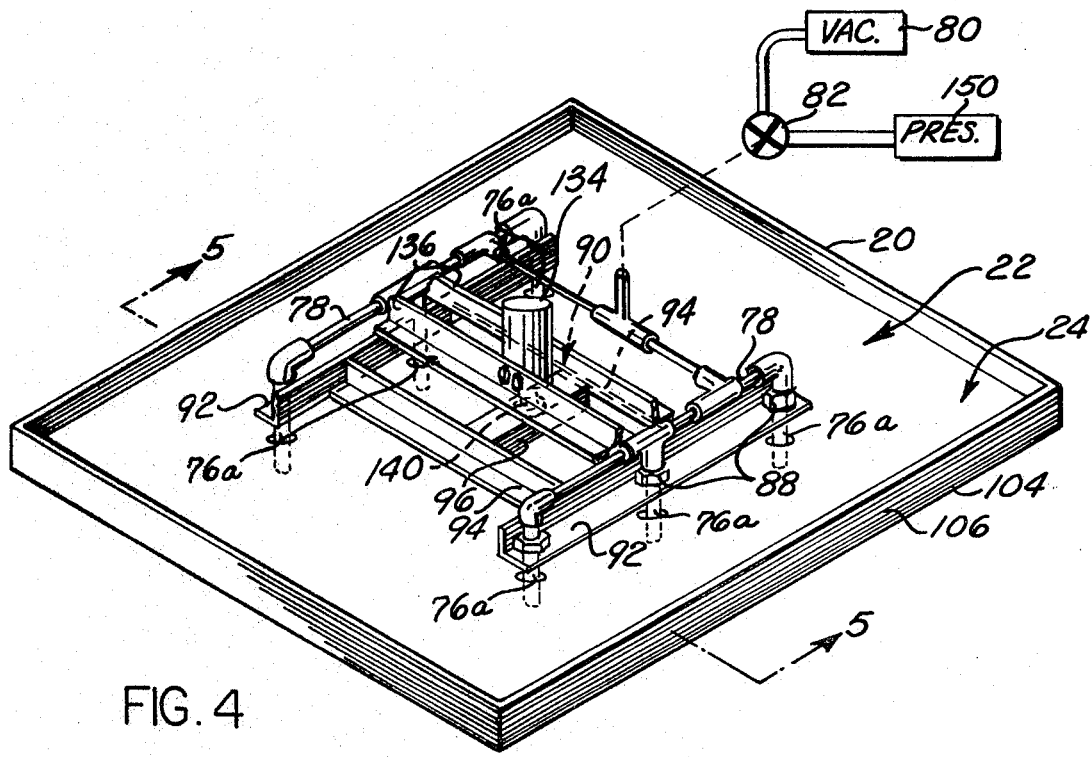

APPARATUS AND METHOD FOR STACKING ARTICLES

The present invention relates to a method and an apparatus for stacking articles and separator sheets and, more particularly, to a method and an apparatus for forming a stack of articles with separator sheets interposed between adjacent layers of the articles.

There are many known apparatuses for stacking layers of articles, such as cans, with separator sheets interposed between adjacent layers of the articles or cans. One such structure is shown in U.S. Pat. No. 3,431,698.

Known apparatuses for stacking articles and separator sheets include a platen mechanism for picking up and depositing articles and separator sheets in a stack. In all of the mechanisms known to applicants, including the apparatus disclosed in the afore-mentioned patent, one depositing movement of the platen is necessary in order to deposit a separator sheet, and another is necessary to deposit the articles. In no prior art known to applicants is there a disclosure in which both the articles and separator sheets are deposited on a stack by the platen simultaneously. Moreover, applicants know of no prior art machine having a pivoted platen which picks up separator sheets and articles, even though separate depositing movements are utilized.

The present invention provides a structure in which a platen is constructed so as to simultaneously support both the articles and the separator sheets in a stacked array and to deposit the stacked array at a platen unloading station. The present invention is also constructed so that in the event a separator sheet, on a stack of separator sheets, is wrinkled or distorted, the platen will function to smooth the separator sheet prior to picking up the separator sheet so as to minimize the wrinkles or distortions in the separator sheet when it is located in the stack. Any wrinkles or distortion of the separator sheet in the stack results in the articles engaging the separator sheet, tilting, or otherwise being shifted so that an optimum stacking condition does not exist.

The apparatus embodying the present invention structurally includes a platen which has means for engaging and picking up the articles to be stacked and also has means for picking up the separator sheets. The means for picking up the articles and the means for picking up the separator sheets are located so that the separator sheets and articles are supported on the platen in a stacked array. The platen is supported for pivotal movement between a separator sheet pickup position, an article pickup position, and a release or unloading position. Means is provided for effecting the pivotal movement of the platen between the various positions. When the platen is located at the separator sheet pickup position, a separator sheet is picked up by the platen. The platen may then be pivoted to the article pickup position and articles are then picked up by the platen in a stacked arrangement with the separator sheet supported by the platen. The platen with the separator sheets and articles supported thereon in a stacked array is then pivoted to an unloading position where the articles and separator sheets are deposited.

The principal object of the present invention is the provision of a new and improved method and apparatus for stacking articles and separator sheets and in which the articles and separator sheets are picked up and supported in a stacked array on a platen and are simultaneously deposited at an unloading station.

A further object of the present invention is the provision of a new and improved apparatus having a pivotally supported platen which moves between a separator sheet pickup position, an article pickup position, and an unloading position, and wherein the platen is provided with means for picking up and supporting the articles and means for picking up and supporting separator sheets.

A still further object of the present invention is the provision of a new and improved stacking mechanism for stacking articles and separator sheets and which includes a platen movable to a separator sheet pickup position for picking up the separator sheets, and wherein the platen is constructed so as to effect a smoothening of the separator sheet prior to pickup of the separator sheet thereby.

Further objects, advantages and features of the present invention will be apparent to those skilled in the art to which it relates from the following detailed description made with reference to the accompanying drawings forming a part of this specification and in which:

FIG. 4 is a perspective view of the platen shown in FIG. 3;

FIG. 5 is a sectional view of the platen shown in FIG. 4 and taken approximately along line 5—5 thereof; and FIG. 6 is a top schematic view of a second embodiment of the present invention.

Figure 1:
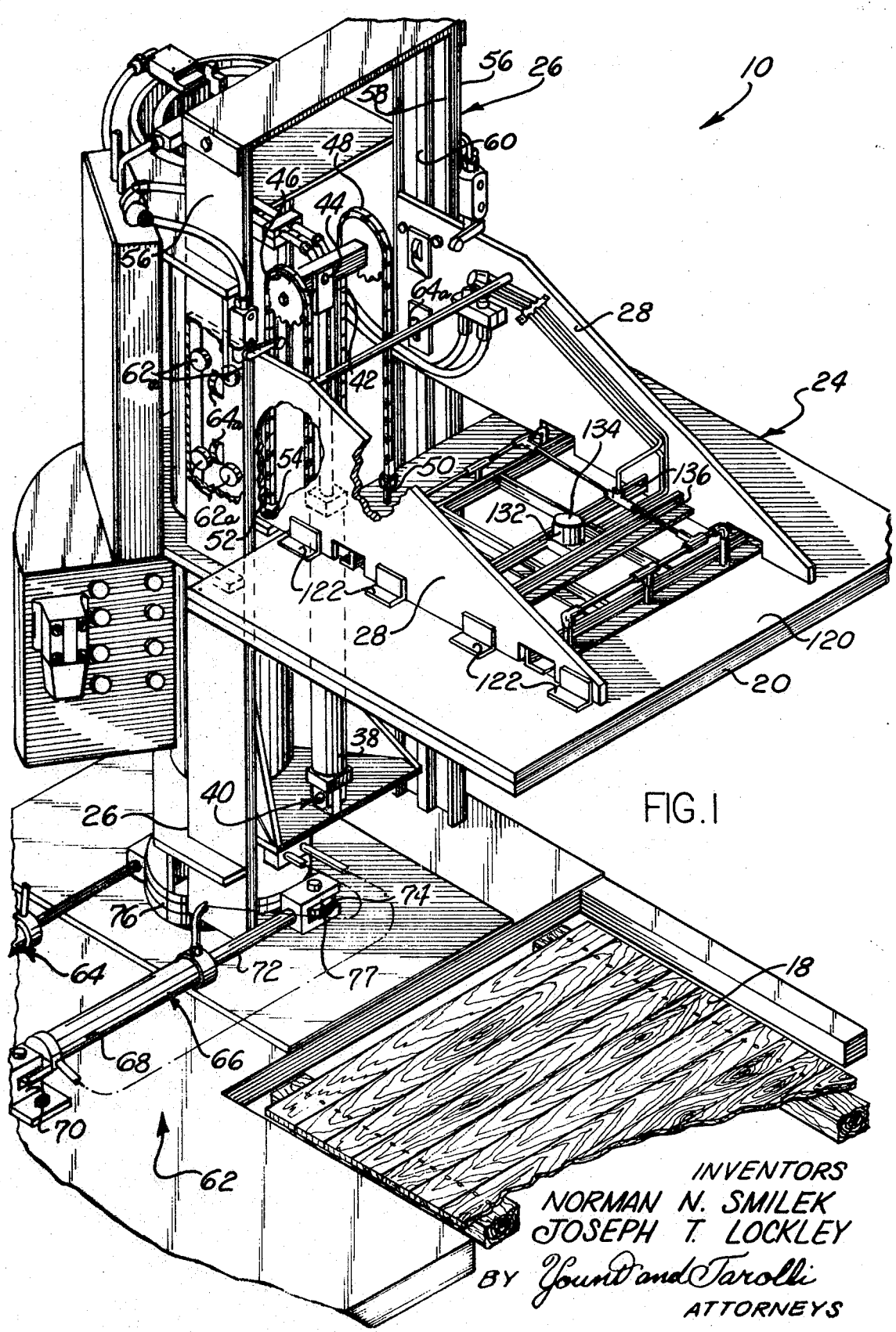
FIG. 1 is a perspective view of a stacking apparatus embodying the present invention.

The present invention provides a new and improved method and apparatus for stacking articles such as cans and separator sheets. The apparatus includes a platen which picks up separator sheets and a matrix of articles. The platen is constructed so as to pick up separator sheets and articles and to support them in a stacked array while moving them to an unloading station where the separator sheet and articles are simultaneously released by the platen. The present invention may be embodied in stacking apparatuses of a wide variety of different constructions and designs and for purposes of illustration is described in the drawings as applied to a stacking apparatus 10, shown in FIG. 1.

Figure 3:
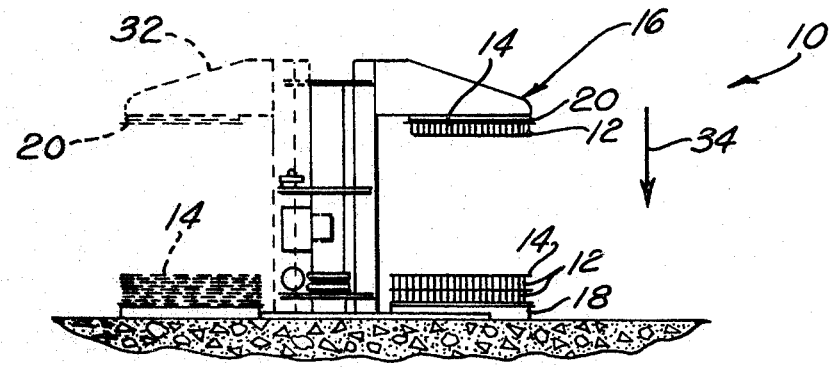
FIG. 3 is a schematic side view of the stacking apparatus of FIG. 1.

The stacking apparatus 10 alternately stacks articles 12, such as cans, or the like, and separator sheets 14 on a pallet 18 located at an unloading position 16, (see FIG. 3). The pallet 18 is located in the unloading position 16 to receive the articles 12 and separator sheets 14. The apparatus 10 of the present invention includes a platen 20 having a separator sheet pickup means 22 and an article pickup means 24 mounted thereon, (see FIGS. 4, 5). The platen 20 is supported by a frame 26 which is rotatable or pivotal, as hereinafter described, to move the platen 20 between its various positions.

In operation, the frame 26 and, consequently, the platen 20 are rotated or pivoted to a sheet pickup position 30 (FIG. 2), in which position the platen 20 is located above a stack of separator sheets 14, as shown in dotted lines at 32 in FIG. 3. The platen 20 is then moved in a downward direction into engagement with the uppermost separator sheet 14 of the stack of separator sheets and presses thereagainst to flatten at least the top separator sheet 14. The separator sheet pickup means 22 is then activated to pick up the uppermost sheet 14.

Figure 2:
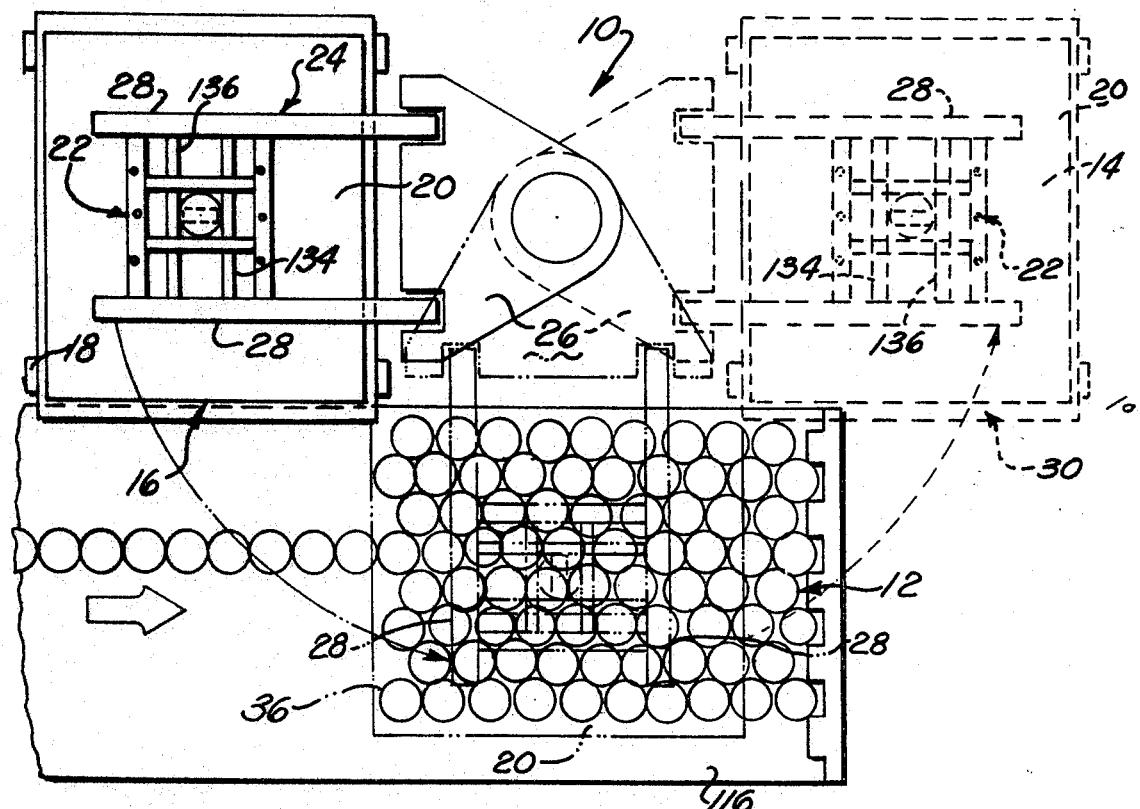
FIG. 2 is a top schematic view of the stacking apparatus of FIG. 1.

The platen 20 is then raised, and the frame 26 is rotated to position the platen 20 in an article pickup position 36 above a plurality of articles, as illustrated in FIG. 2. The platen 20 is then lowered so that the separator sheet 14, retained thereon, is at least located immediately adjacent a plurality of articles 12. The articles pickup means 24 is then activated to secure the articles 12 to the platen 20. The article pickup means functions even though a separator sheet is supported on the platen 20, and as a result the articles 12 and separator sheet 14 are supported on the platen 20 simultaneously and in a stacked array.

After the articles are picked up or gripped by the platen 20, the platen 20 is raised and the frame 26 subsequently rotated so that the stacked array of the separator sheet 14 and articles 12 on the platen is positioned above the pallet 18 at the unloading position 16 (see FIG. 3.). The platen 20 is then lowered so that the articles 12 are in contact with the pallet 18. If other articles and separator sheets are supported by the pallet 18, the platen 20 is lowered to a position where the articles supported thereby are in contact with the uppermost separator sheet. The separator sheet pickup means 22 and article pickup means 24 are then deactivated so that the articles 12 and separator sheets 14 are deposited simultaneously in a stacked array on the pallet 18. The above operations are repeated until a completed stack is formed on the pallet 18.

The apparatus 10 includes a mechanism for moving the platen 20 vertically relative to the frame 26. This mechanism includes a lift cylinder 38. The lift cylinder 38 is pivotally secured to the frame 26 by means of a suitable clevis arrangement, generally indicated at 40. The other end of the cylinder 38 has a complementary clevis arrangement 42 which pivotally receives a member 44, as shown in FIG. 1. Sprocket members 46 are rotatably mounted at each end of the member 44 and are positioned to engage chains 48. Each of the chains 48 has one end 50 secured to the plate 20. The other ends of the chains 48 are secured to the frame 26 by a threaded member 52 extending through an opening 54 in the frame 26.

Movement of the lift cylinder 38 produces movement of sprockets 46. The sprockets 46 mesh with a portion of the chains 48 intermediate their ends so that when the lift cylinder 38 moves in an upward direction, the sprockets 46 will create an upward force on the chains 48 to move the platen 20 upward.

In order to guide the platen 20 as it is moved vertically, the frame 26 includes vertical columns 56. The vertical columns 56 have a pair of slots 58 therein and a central surface 60 therebetween. The platen has a pair of arms 28 secured thereto, and each of the arms 28 has cam members 62a mounted thereon. One pair of cam members 62a is secured to one arm 28 in a position so that the cams 62a are received by one of the channels or slots 58, and another pair of cam members 62a is secured to the other arm 28 and is positioned so that the cam members are received in the other channel or slot 58. The cam members 62a are in the form of rollers which guide the platen 20 as it is moved in a vertical direction.

Further stability of the platen is provided by a pair of rollers 64a secured to the arms 28. The rollers 64a are mounted so that they ride along the surface 60 and prohibit the arms 28 from locking up on the members 56 due to off-centered loads. It should be understood that the rollers 62a, 64a may be of any design and are secured to the arms 28 in any conventional manner well known to those skilled in the art. In order to lower the platen 20, fluid is exhausted from the lift cylinder, and the platen 20 lowers by gravity.

As noted above, the platen 20 is rotated between its positions and to this end the frame 26 is rotatably mounted on a fixed base 62. Rotational drive means 64, 66 are provided to rotate the frame 26 in either direction upon actuation thereof. Since each of the rotational drive means 64, 66 is similar in construction, only the drive mechanism 66 will be described in detail hereinafter.

The rotational drive means 66 includes a drive cylinder 68 pivotally secured to the base 62 by means of a bracket 70. The piston rod 72 of the cylinder 68 is pivotally attached to a member 74 of a ratchet mechanism 76 by a clevis arrangement 77. When the member 74 of the ratchet mechanism 76 is moved by the cylinder 68 in one direction, the frame 26 is correspondingly rotated in that direction. When the cylinder 68 moves the extension member 74 in the other direction, no torque is transmitted to the frame 26 and, therefore, the frame is not rotated thereby. The other rotational drive mechanism 64 operates in a manner as described in connection with the rotational drive mechanism 66 to rotate the frame 26 in the other direction.

It should be understood that the ratchet mechanism 76 operates in a manner well known to those skilled in the art and may be any conventional ratchet mechanism or unidirectional drive means. It should be clearly understood that the rotational drive means 64, 68 are merely illustrative in nature and other means may be used for pivoting or rotating the frame 26.

When the platen 20 is rotated to its separator sheet pickup position 20 and lowered into engagement with the uppermost separator sheet on a stack thereof, the sheet pickup means 22 on the platen 20 is activated to pick up the separator sheet. The separator sheet pickup means 22 includes a series of nozzle tubes 76a, as shown in FIG. 4, which are connected together by means of conduits 78. The conduits 78 are connected to a vacuum supply 80 through a three-position valve 82. When the valve 82 is in a first position, the vacuum supply 80 is connected to the vacuum tubes 76a and draws a vacuum thereon. Conversely, when the valve 82 is in a second position, the vacuum generated by the vacuum supply 80 is no longer drawn on the tube 76a but rather a source of pressurized fluid 150 is connected to the conduit 78. The third position of the valve 82 may be a closed position. When a vacuum is connected to the tubes 76a, the sheet pickup means is in an activated condition and can pick up a sheet 14.

The upper portion of each tube 76a has a threaded portion 84 which terminates in a shoulder 86, as seen in FIG. 5. The tube 76a has a longitudinal bore 100 extending therethrough. The upper portion of the bore 100 has an internally threaded end 102 for receiving a fluid fitting 104a of the conduit 78. The other end of the tube 76a is secured to a platelike member 106 and includes a countersunk aperture 104 in communication with the bore 100, which aperture increases the area over which the vacuum drawn through the opening 100 acts on the separator sheet.

As seen in FIG. 4, a frame 90 supports the tubes 76a and includes longitudinal members 92 connected by cross members 94. A member 96 is secured to and positioned between the cross members 94. Openings 88 in the longitudinal members 92 receive the threaded ends 84 of the tubes 76a, as seen in FIG. 5, and engage the shoulders 86 thereof. Threaded fasteners 98 threadedly engage the threaded portions 84 of the tubes 76a and clamp the tubes 76a to the frame 90 so that the tubes move with the frame 90.

The platelike member 106 is made of sheet metal and is provided with a surface 108 which is adapted to support a separator sheet 14 thereon, as shown in FIG. 5. As hereinabove described, one end of each of the tubes 76a is secured to the member 106 so that when a vacuum is applied thereto, a separator sheet is drawn into engagement with the surface 108 of the member 106. Moreover, the member 106, being a generally flat, platelike member, acts to smooth the separator sheet prior to pickup thereof.

As noted above, the platen lowers under its own weight and the member 106 moves into engagement with the topmost sheet of the stack of separator sheets 14. The weight of the platen 20 is then supported by the stack of separator sheets. More specifically, the undersurface 108 of the platelike member 106 engages the uppermost separator sheet and tends to flatten or smooth that separator sheet prior to activation of the separator sheet pickup means 22. When a separator sheet 14, as shown by the dashed wavy lines 114 in FIG. 5, is pressed by the weight of the platen, it will become flattened and smoothed. After smoothing of the separator sheet, the valve 82 is moved to its position so as to draw a vacuum in the tube 78 in order to effect pickup of the separator sheet by the platen 20. The smoothing of the separator sheet prior to pickup thereof is important in view of the fact that a sheet with wrinkles in it would detrimentally affect the stacking of the cans or articles which engage that sheet in the stack and thereby make stacking extremely difficult.

The valve 82 is maintained in its position applying vacuum to tubes 76 as the lift cylinder 38 is activated to move the platen 20 to a raised position above the separator sheets. After the platen 20 has moved to such raised position, the rotating means is activated to rotate the frame 26 and, consequently, the platen 20 to a position adjacent to and above a matrix of articles contained on an article support device or feeder 116, as shown in FIG. 1. The lift cylinder 38 is then activated to lower the platen 20 to a position so that the separator sheet 14 retained thereon is in close proximity to or in contact with the matrix of articles positioned directly beneath the separator sheet 14.

The matrix or layer of articles 12 is, as noted above, picked up by the platen and supported thereon in a stacked array with the separator sheet on the platen. In order to pick up the articles, which are metal cans, the platen 20 is provided with permanent magnetic material 118, as seen in FIG. 5. The magnetic material is included in a base 112 of the platen 20. The base 112 also includes an upper member 120 which is secured to the arms 28 of the frame 26 by means of the angle members 122 as seen in FIG. 1. The angle members 122 are welded to the arms 28 and to the upper member 120.

As seen in FIG. 5, the base 112 includes a retaining member 124 for retaining the magnetic material 118 and member 120 together. The retaining member 124 includes a lower portion extending into the permanent magnet 118 and adjacent to the member 106. The retaining member 124 has upwardly extending flanges 126 and an upper flange portion 128 engaging the upper surface of the member 120. Fasteners 130 secure the member 124 to the upper member 120 so that the integral base 112 is provided having the magnetic material 118 incorporated therein, as seen in FIG. 5.

When the member 106 is in the position shown in FIG. 5, the distance between the magnetic material 118 and the articles 12 is at a minimum so that the magnetic force created by the magnetic material 118 and acting on the articles is sufficient to pick up and support a matrix or layer of articles 12, even when the separator sheet 114 is interposed between the articles 12 and the surface 108 of the member 106. Thus, when the platen 20 is raised, the matrix of articles 12 is supported thereby, as well as the separator sheet.

The configuration of the layer of articles supported by the platen 20 is such that the articles may be readily stacked on the pallet 18. This configuration is determined by the article-supporting device or feeder 116 which may include a conveyor belt moving a single line of articles therealong with a stop on one end thereof. The feeder includes restraining means so that the articles 12 are moved by the conveyor belt into a predetermined matrix and positioned so that the predetermined matrix will be picked up as a layer by the article pickup means 24 on the platen 20. Insofar as the present invention is concerned, any article-supporting device or feeder may be used.

Once the layer of articles 12 are supported by the platen 20, the lift cylinder 38 is actuated so that it moves the platen 20 to the raised position, as hereinabove described. The rotary drive means is then activated to rotate the frame 26 and, consequently, the platen 20 so that the articles 12 and separator sheet supported by the platen 20 are positioned above the pallet 18 in the position 37 shown in FIG. 1.

The lift cylinder 38 is then activated to lower the platen 20 to a position so that the article 12 supported thereon engage the pallet 18 or the uppermost separator sheet 14 of the last layer of articles positioned on the pallet 18. At this point, the separator sheet and articles are released simultaneously from the platen 20 by the article-releasing means, generally indicated at 132 in FIG. 1.

The article-releasing means 132 includes a cylinder 134 attached to the arms 28 by means of the channel members 136. The cylinder 134 is secured to the cross members 136 and has its piston rod 138, as seen in FIG. 5, secured to the cross member 96 of the frame 90. The end of the piston rod 138 extends through an opening 140 of the cross member 96, as seen in FIG. 5, and is threaded to receive upper and lower nuts 142, 144, respectively. When the nuts 142, 144 are properly tightened, the frame 90 and the piston rod 138 are secured together so that the frame 90 moves vertically upon actuation of the cylinder 134. Since the cylinder 134 is secured to the arms 28 by means of the cross members 136, the frame 90 moves relative to the base 112 upon actuation of the cylinder 134. The tubes 76 have a sliding engagement with the base 112 and slide relative thereto upon movement of the frame and, of course, the plate 106 moves therewith.

In order to unload the separator sheet 14 and articles 12 from the platen 20, the cylinder 134 is activated to move the piston rod 138 so that the member 106 connected to the frame 90 by the tubes 76 is moved away from the base 112. This increases the space between the magnetic material 118 and the articles carried with member 106. When the distance between the articles and the magnetic material 118 is increased, the magnetic force holding the articles 12 is decreased. When the cylinder 134 has moved the member 106 and, consequently, the articles 12 a sufficient distance from the magnetic material 118, the force created thereby is insufficient to maintain the support of the articles 12, and the articles 12 are released from the platen 20.

In order to release the separator sheet 14 from the platen 20, the valve 82 connecting the tubes 76 to the vacuum supply 80 is moved to a position so that vacuum is no longer supplied to the tube 76, as shown in FIG. 4, and to connect the pressure supply 150 to the tubes 76. The separator sheet is thus released by a blast of pressurized fluid through the tubes 76.

After the separator sheet 14 is released from the platen 20, the platen 20 is raised by the lift cylinder 38 in a manner hereinabove described. The cylinder 134 is then activated to retract the member 106 so that the distance 146, as seen in FIG. 6, is decreased to allow the machine to be recycled and deposit another separator sheet and layer of articles on the pallet to form a complete stack.

It should be understood that the separator sheet pickup means 22 and article pickup means 24 mounted on the platen 20 may be of other designs. Another design of the article pickup means 24 includes replacing the magnetic material 118 of the preferred embodiment with a series of electromagnetic coils which are activated by connecting the coils with a source of electrical energy. These coils may be deactivated when it is desirable to release the articles from being supported by the platen 20 by disconnecting the coils from the source of electrical energy. Such a design would eliminate the necessity for the cylinder 134 and the movable feature of the member 106 with respect to the base 112. It should be understood that such a design is fully within the contemplation of the present invention. Another design may utilize vacuum to pick up articles, as well as to pick up the separator sheets. Such a design is shown in FIG. 6. For ease of description, parts illustrated in FIG. 6 which are similar to parts shown in FIGS. 1-5 will be designated with the corresponding reference numeral with the letter "a" appended thereto.

The platen 20a, as shown in FIG. 7, includes a sheet pickup means 22a, as described hereinabove in connection with FIGS. 1-5, and an article pickup means 24a. The article pickup means 24a includes a series of tubes 160 extending through a base member 161 and having conduits 162 interconnecting the tubes 160.

The tubes 160 are in communication with a source of vacuum 164 and a source of pressure 166 through a valve 168. The valve is positionable in a first position so that the vacuum supply 164 draws a vacuum through the tubes 160 and, consequently, serves to pick up and hold the articles 12a on the platen 20a. In such a first position of the valve 168, the source of pressure 166 is disconnected from the tubes 160. It should be understood that the separator sheet 14a interposed between the platen 20a and the articles 12a is sufficiently porous to allow the vacuum drawn through the tubes 160 to be drawn through the separator sheet 14a so that the vacuum is exerted on the articles 12a to support the articles 12a on the platen 20a.

When it is desirable to release the articles 12a, as shown in dotted lines in FIG. 6, the valve 168 is moved to a second position so that the vacuum 164 is disconnected from, and the pressure source 166 is connected to the tubes 160. Thus, when the valve 168 is in the closed position, the articles are no longer supported from the platen 20a and are released therefrom. It should be understood that the movement of the valve 168 is co-ordinated with the movements of the device 10 so that the device of the present invention operates in the manner hereinabove described.

It should be apparent that in the embodiments disclosed hereinabove, the separator sheet is picked up by the platen 20 prior to the platen picking up the articles. The platen could be constructed so that the articles would be picked up first prior to pickup of the separator sheet. Moreover, it should also be apparent that suitable controls are necessary in order to effect actuation of the various cylinders for effecting movement of the platen, and such controls are within the domain of one skilled in the art and, accordingly, have not been disclosed or described herein.

While the above description emphasizes the stacking function performed by the apparatus, the apparatus can also be used for unstacking.

Having described our invention, what we claim is:

1. A stacking mechanism for stacking articles and separator sheets comprising a platen movable between an article pickup position, a separator sheet pickup position, and an unloading position, means for moving said platen between said positions, said platen having means thereon for picking up separator sheets at said separator sheet pickup position and articles at said article pickup position and for supporting the articles and separator sheets thereon in a stacked array, and means for releasing said stacked array at the unloading station.

2. A stacking mechanism as defined in claim 1 and further including means supporting said platen for vertical movement to pick up articles and separator sheets and to deposit said stacked array.

3. A stacking mechanism as defined in claim 2 wherein said platen includes a platelike member which presses and thereby smooths a separator sheet prior to pickup thereof.

4. A stacking mechanism as defined in claim 1 wherein said article pickup means includes means for creating a magnetic field having sufficient strength to pick up articles on said platen.

5. A stacking mechanism as defined in claim 4 wherein said platen includes a member against which said one article is attracted by said magnetic field thereon, and means for moving said member relative to said means for creating said magnetic field between a first position wherein said one article is a first predetermined distance from said means for creating said magnetic field whereby the article is picked up and a second position wherein said one article is a second predetermined distance from said means for creating a magnetic field wherein the article is released.

6. A stacking mechanism for stacking articles and separator sheets comprising a platen pivotal between a sheet pickup position and an article pickup position, means supporting said platen for said pivotal movement between said positions, a separator sheet pickup means on said platen for picking up at least one separator sheet from a supply of separator sheets upon actuation thereof when said platen is in the separator sheet pickup position, article pickup means on said platen for picking up at least one article from an array of articles when said platen is in said article pickup position, means for effecting unloading of said platen, and means operable to pivot said platen between said positions.

7. A stacking mechanism for stacking articles and separator sheets as defined in claim 6 further including means for moving said platen to press and thereby smooth a separator sheet before picking up said separator sheet.

8. A stacking mechanism for stacking articles and separator sheets as defined in claim 6 wherein said separator sheet pickup means includes means for connecting a source of vacuum to a pickup surface of said platen, said separator sheet pickup means being actuated to pick up a separator sheet upon a vacuum being applied to the pickup surface of the platen.

9. A stacking mechanism for stacking articles and separator sheets as defined in claim 6 wherein said article pickup means includes means for creating a magnetic field having sufficient strength to pick up articles on said platen.

10. A stacking mechanism as defined in claim 9 wherein said platen includes a member against which said one article is attracted by said magnetic field thereon, and means for moving said member relative to said means for creating said magnetic field between a first position wherein said one article is a first predetermined distance from said means for creating said magnetic field whereby the article is picked up and a second position wherein said one article is a second predetermined distance from said means for creating a magnetic field wherein the article is released.

11. A stacking mechanism for stacking articles and separator sheets as defined in claim 6 wherein said article pickup means includes means for connecting a source of vacuum to said platen for picking up said one article so that said one article is supported on said platen.

12. A stacking mechanism as defined in claim 6 wherein said article pickup means and said separator sheet pickup means are located on the platen so as to support the separator sheet and articles thereon in a stacked array, and said platen has an unloading position at which the separator sheet and articles are unloaded therefrom.

13. A method for alternately stacking articles and separator sheets comprising the steps of moving a platen to a separator sheet pickup position, picking up a separator sheet with the platen, moving the platen to an article pickup position, picking up at least one article from an array of articles with the platen, supporting the article and separator sheet in a stacked array by the platen, moving the platen to an unloading position while supporting the article and separator sheet in the stacked array, and releasing the stacked array supported by the platen at the unloading position.

14. A method for alternately stacking articles and separator sheets as defined in claim 13 wherein the separator sheet is picked up by the platen before any article is picked up thereby.

15. A method for alternately stacking articles and separator sheets as defined in claim 13 which includes the step of exerting pressure between the platen and the separator sheet to smooth the separator sheet before the step of picking up the separator sheet with the platen.

* * * * *